mann, Wiesloch (DE);

(12) United States Patent
Erdtmann et al.

(10) Patent No.: US 7,979,733 B2
(45) Date of Patent: Jul. 12, 2011

(54) HEALTH CHECK MONITORING PROCESS

(75) Inventors: Uwe Erdtmann, Wiesloch (DE);
Thomas Schneider, Heidelberg (DE);
Lee Downham, Schriesheim (DE);
Michael Kloeffer, Woerth (DE); Stefan Krimmel, Muehlhausen (DE); Xue Bai, Shanghai (CN); Chongyao Wang, Shanghai (CN)

(73) Assignee: SAP AG (DE)

( * ) Notice: Subject to any disclaimer, the term of this patent is extended or adjusted under 35 U.S.C. 154(b) by 510 days.

(21) Appl. No.: 11/322,890

(22) Filed: Dec. 30, 2005

(65) Prior Publication Data
US 2007/0174716 A1 Jul. 26, 2007

(51) Int. Cl.
*G06F 11/00* (2006.01)
(52) U.S. Cl. .................. 714/4; 714/25; 714/26; 714/37; 714/39; 714/45; 714/47; 714/48; 709/224
(58) Field of Classification Search .................. 714/39, 714/25, 37, 26, 48; 706/45, 47
See application file for complete search history.

(56) References Cited

U.S. PATENT DOCUMENTS

| | | | |
|---|---|---|---|
| 5,436,966 A | 7/1995 | Barrett et al. | |
| 6,177,932 B1 | 1/2001 | Galdes et al. | |
| 6,199,068 B1 | 3/2001 | Carpenter | |
| 6,230,287 B1 | 5/2001 | Pinard et al. | |
| 6,272,333 B1 | 8/2001 | Smith | |
| 6,289,378 B1 | 9/2001 | Meyer et al. | |
| 6,304,893 B1 | 10/2001 | Gish | |
| 6,389,426 B1 | 5/2002 | Turnbull et al. | |
| 6,424,991 B1 | 7/2002 | Gish | |
| 6,434,598 B1 | 8/2002 | Gish | |
| 6,598,167 B2 | 7/2003 | Devine et al. | |
| 6,611,955 B1 * | 8/2003 | Logean et al. | 717/128 |
| 6,615,258 B1 | 9/2003 | Barry et al. | |
| 6,654,915 B1 * | 11/2003 | Lu et al. | 714/57 |
| 6,691,159 B1 | 2/2004 | Grewal et al. | |
| 6,714,976 B1 * | 3/2004 | Wilson et al. | 709/224 |
| 6,718,489 B1 * | 4/2004 | Lee et al. | 714/43 |
| 6,799,147 B1 | 9/2004 | Balasubramanian et al. | |
| 6,829,734 B1 | 12/2004 | Kreulen et al. | |
| 6,859,783 B2 | 2/2005 | Cogger et al. | |
| 6,892,317 B1 * | 5/2005 | Sampath et al. | 714/4 |
| 6,930,695 B1 | 8/2005 | Pabla | |

(Continued)

OTHER PUBLICATIONS

SmarterTickets 1.x (SmarterTools.com), version 1.0.1561; released Apr. 10, 2004; 49 pages.

(Continued)

*Primary Examiner* — Scott T Baderman
*Assistant Examiner* — Chae Ko
(74) *Attorney, Agent, or Firm* — Fish & Richardson P.C.

(57) ABSTRACT

A health check monitoring process embedded in a client system provides automation of monitoring processes of system and application components and creates and pushes incidents and/or administration tasks to a user or user interface if a critical situation or event, such as a monitored status of a component exceeds a predetermined threshold value or state, is detected. The creation of an incident includes automatically collecting context data associated with the event, generating a incident report associated with the collected diagnostic data and generating an incident service request based on the incident report. The context data may include technical and application information that is usually required to resolve the incident. The user interface includes various views depicting different levels of information related to the service request, such as an incident work list, details of a particular incident and details of the context data associated with an incident.

20 Claims, 9 Drawing Sheets

U.S. PATENT DOCUMENTS

| | | | |
|---|---|---|---|
| 6,985,944 B2 | 1/2006 | Aggarwal | |
| 7,003,502 B1 | 2/2006 | Wizdo et al. | |
| 7,225,139 B1 | 5/2007 | Tidwell et al. | |
| 7,225,367 B2 | 5/2007 | Hashem et al. | |
| 7,305,465 B2 | 12/2007 | Wing et al. | |
| 7,340,038 B2 | 3/2008 | Boetje et al. | |
| 7,366,731 B2 | 4/2008 | Lewis et al. | |
| 7,516,450 B2 | 4/2009 | Ogura | |
| 2002/0073355 A1* | 6/2002 | Cerami et al. | 714/4 |
| 2002/0087680 A1* | 7/2002 | Cerami et al. | 709/224 |
| 2002/0103987 A1 | 8/2002 | Jaffrey | |
| 2002/0138571 A1 | 9/2002 | Trinon et al. | |
| 2002/0165952 A1* | 11/2002 | Sewell et al. | 709/224 |
| 2002/0177910 A1* | 11/2002 | Quarterman et al. | 700/28 |
| 2003/0051184 A1* | 3/2003 | Black et al. | 713/400 |
| 2003/0056140 A1* | 3/2003 | Taylor et al. | 714/4 |
| 2003/0061541 A1* | 3/2003 | Kaler et al. | 714/37 |
| 2003/0067704 A1* | 4/2003 | Woo et al. | 360/69 |
| 2003/0110248 A1 | 6/2003 | Ritche | |
| 2003/0144894 A1 | 7/2003 | Robertson et al. | |
| 2003/0189600 A1 | 10/2003 | Gune et al. | |
| 2004/0015953 A1 | 1/2004 | Vincent | |
| 2004/0044987 A1 | 3/2004 | Kompalli et al. | |
| 2004/0078695 A1* | 4/2004 | Bowers et al. | 714/39 |
| 2004/0088404 A1 | 5/2004 | Aggarwal | |
| 2004/0117689 A1* | 6/2004 | Harper et al. | 714/43 |
| 2004/0123304 A1 | 6/2004 | Black et al. | |
| 2004/0187103 A1 | 9/2004 | Wickham et al. | |
| 2004/0205374 A1* | 10/2004 | Poletto et al. | 714/4 |
| 2004/0230559 A1 | 11/2004 | Newman et al. | |
| 2005/0021847 A1 | 1/2005 | Rothman et al. | |
| 2005/0022177 A1 | 1/2005 | McCaleb et al. | |
| 2005/0033625 A1* | 2/2005 | Kline | 705/9 |
| 2005/0038827 A1 | 2/2005 | Hooks | |
| 2005/0091640 A1* | 4/2005 | McCollum et al. | 717/117 |
| 2005/0097396 A1 | 5/2005 | Wood | |
| 2005/0144526 A1* | 6/2005 | Banko | 714/38 |
| 2005/0172243 A1 | 8/2005 | Pabla | |
| 2005/0273667 A1* | 12/2005 | Shrivastava et al. | 714/38 |
| 2006/0095392 A1* | 5/2006 | Arend | 706/45 |
| 2006/0116981 A1 | 6/2006 | Krimmel et al. | |
| 2006/0191007 A1 | 8/2006 | Thielamay | |
| 2007/0150812 A1 | 6/2007 | Hu | |
| 2007/0162485 A1 | 7/2007 | Haeberle et al. | |
| 2007/0174731 A1 | 7/2007 | Haeberle et al. | |
| 2007/0203712 A1 | 8/2007 | Sunday et al. | |
| 2008/0056476 A1 | 3/2008 | Pounds et al. | |

OTHER PUBLICATIONS

Office Action issued in U.S. Appl. No. 11/322,946 on Sep. 21, 2009; 19 pages.

Office Action issued in U.S. Appl. No. 11/322,946 on Mar. 29, 2010; 19 pages.

Notice of Allowance issued in U.S. Appl. No. 11/322,946 on Dec. 10, 2010; 7 pages.

* cited by examiner

FIG. 7

Incident Context Data UI
800

*Context Data*

Context Data 802

| | Provider Sanity | | Provider ID | | Context Description | Show Details in parallel Hide Filter |
|---|---|---|---|---|---|---|
| | | ✗ | ABAP/SysInfo | | System Status | |
| | ⊡ ◀ ▶ ▼ ▲ ≡ | | J2EE/Logfile | | Java Logfile | |

804  806
| Content | Provider Properties |

| | Time | Category | Date | Provider ID | DSR Component | Message | Location |
|---|---|---|---|---|---|---|---|
| ▣ | 9:47:50.507 | /System/Database/sql/buffer | 06/27/2005 | | n/a | Buffer "P128090:PMO:SAPPMODB" with maximal 16777216 Bytes started (Settings: maxrecordsize = 2097152; maxiobsize = 1048576; displacement active = true; reloaddelay = 5) | com.sap.sql.buffer.TBJBuffer |
| ▣ | 9:22:26.794 | /System/Database/sql/buffer | 06/25/2005 | | n/a | Buffer "P128090:PMO:SAPPMODB" was closed | com.sap.sql.buffer.TBJBuffer |
| ▣ | 17:11:24.973 | /System/Database/sql/buffer | 06/23/2005 | | n/a | Buffer "P128090:PMO:SAPPMODB" with maximal 16777216 Bytes started (Settings: maxrecordsize = 2097152; maxiobsize = 1048576; displacement active = true; reloaddelay = 5) | com.sap.sql.buffer.TBJBuffer |
| ⊙ | 17:07:03.429 | /System/Database/sql/jdbc/direct | 06/23/2005 | | n/a | Connection object com.sap.sql.jdbc.direct.DirectPooledConnection @d480ea has already been closed | com.sap.sql.jdbc.direct.DirectPooledConnection |
| ▣ | 17:07:03.038 | /System/Database/sql/buffer | 06/23/2005 | | n/a | Buffer "P128090:PMO:SAPPMODB" was closed | com.sap.sql.buffer.TBJBuffer |

⎫
⎬ 806
⎭

[Close]

FIG. 8

HEALTH CHECK MONITORING PROCESS

BACKGROUND

The subject matter described herein relates to monitoring and task management in information technology (IT) systems.

Conventional IT systems require considerable time, effort, knowledge and experience in order to implement, monitor and operate on a day-to-day basis. Even large IT departments often become lost in a maze of complex tools and technologies and thousands of pages of administration guides that are usually necessary to operate and maintain the components of such IT systems. Moreover, IT departments, in particular IT administrators, are overwhelmed with various day-to-day reactive support tasks and often have limited resources and operating budgets to handle those support tasks, which typically include normal system management activities, such as manually monitoring, checking and clearing log files, performing patches and updates, executing backup and recovery procedures, and user management, and managing and assisting end users, such as processing service requests and supporting end users having trouble with the customer's systems.

The task of manually monitoring each component of the IT system to ensure the health of the system is particularly difficult for many IT departments. Not only is this task time consuming, but also it requires significant IT resources to complete. Moreover, the practice of manually monitoring the system can be complicated and error prone.

SUMMARY

The present inventors recognized the deficiencies of conventional system management techniques, in particular the need to manually monitor the components of the IT system to ensure the systems operational stability and health. Consequently, the present inventors developed the subject matter described herein, which, for example, provides automation of monitoring processes of system and application components and automatically creates and pushes incidents and/or administration tasks to a user if a critical situation is detected, such as when a monitored status changes, both of which ensure the safe, stable and healthy operation of an IT system.

An incident is any event which is not part of standard operation of an IT service and which causes, or may cause, an interruption to, or a reduction in, the quality of that service (e.g., faults, errors, malfunctions, etc. of an IT service). Should such an event occur, the subject matter described herein automatically collects context or diagnostic data associated with the event, such as technical and application information, package the context data with a problem description and severity in an incident report, and generates an incident service request.

An administration task is a single activity or a group of activities within the IT system that need to be performed in order to reach specific end results. Administration tasks can relate to a defined activity, such as the change of a configuration parameter. Administration tasks also can be used for incident and problem solution, prevention (i.e., the execution of regulation maintenance steps required to help keep the IT system stable), and other activities, such as configuration changes, parameterization, user creation and system restart. A simple example of an administration task is a "how-to-guide," which describes a well-defined activity step by step. A complex example of an administration task is a guided activity transaction (e.g., a wizard), which guides the user through a well-defined activity.

In one aspect of managing a system, one or more generated events are selectively received. Each generated event may indicate a change in an operational parameter of components of the system and is received if the event triggers one or more predetermined logical rules. Thereafter, for each received event, it is determined whether the received event has an associated predefined task. Then, a generation of an incident for each received event not having an associated predefined task is initiated. The components of the system can include application software modules such as a customer relation management module, a supplier relation management module, a financial management module, a supply chain management module, a human capital management module and a project management module. In some implementations, a generation of an administrative task for each received event having an associated predefined task is initiated. In some implementations, the one or more predetermined logical rules includes either an AND, an OR, an XOR, a NOR, a NAND, or a NOT logical operation. In some implementations, one of the predetermined logical rules is an error severity threshold, wherein the error severity threshold is either a system failure or a message failure.

In one variation of determining whether the received event has an associated predefined task, a number of predefined events are received. Each predefined event is associated with one or more predefined tasks that are needed to resolve the associated predefined event. Thereafter, it is determined, for each received event, whether the received event is a predefined event. Then for each received event, the one or more predefined tasks are associated with the received event that is a predefined event.

In one variation of initiating a generation of an incident for each received event not having an associated predefined task, context data associated with each received event are automatically collected. Then, for each received event, an incident report is generated based on the collected context data. Thereafter, for each incident report, an incident service request is generated based on the generated incident report is generated. In some implementations, the collected context data are stored and the generated incident service request is associated with the stored context data. In some implementations, the generated incident service request is displayed in one or more views of a graphical user interface.

In one variation of selectively receiving one or more generated events, the one or more generated events are received when initiated by an activating signal generated based a predetermined time schedule.

In another variation of selectively receiving one or more generated events, operational parameters of components of the system are monitored. If there is a change in one or more of the operational parameters, that change is detected. Then, an event is generated for each detected change. Thereafter, each event is stored in a system configuration data store. Next, each stored event is retrieved from the system configuration data store upon generation of an activating signal if the stored event triggers one or more predetermined logical rules.

In an interrelated aspect, one or more generated events are received in response to a system-generated activating signal. Each generated event can indicate a change in a monitored operational parameter of one of a number of components of a system. Thereafter, diagnostic data associated with each generated event is automatically collected. The diagnostic data is substantially all data that is needed to resolve the generated event. Then, for each generated event, an incident report is generated based on the collected diagnostic data. Thereafter, an incident service request is generated for each incident report. The collected diagnostic data is associated with the generated incident service request.

In on variation of generating an incident report, for each generated event, based on the collected diagnostic data, the collected diagnostic data associated with the generated event is received. Then, a description of the generated event in a message based on the received diagnostic data is provided with the received diagnostic data attached to the message.

In some implementations, each generated incident service request is displayed in one or more views of a graphical user interface, wherein at least one view provides the collected diagnostic data associated with the generated incident service request. In some implementations, at least one view provides a list of generated incident service requests.

In one variation of receiving one or more generated events in response to a system generated activating signal, each generated event indicating a change in a monitored operational parameter of a component, operational parameters of components of the system are monitored. If a change in the operational parameters occurs, the change is detected. Then, an event for each detected change is generated. Thereafter, each event is stored in a system configuration data store. Each stored event is retrieved from the configuration data store upon generation of an activating signal.

In an interrelated aspect, one or more generated events are received. Each generated event indicates a change in a monitored operational parameter of one of a number of components. The received event is classified as an incident when at least one of a number of predefined logical rules is satisfied. For each classified event, context data is automatically collected. Then, a problem report is generated, wherein the problem report includes a description of the classified event. Thereafter, an incident service request is generated, for each classified event, including the description of the classified event from the corresponding problem report. In some implementations, each generated incident service request is displayed in one or more views of a graphical user interface, wherein at least one view provides the collected diagnostic data.

In one variation of classifying a received event as an incident when at least one of the number of predefined logical rules is satisfied, one or more of the received events is selected based on the predetermined rules. Then, it is determined whether the selected event has an associated predefined task. Thereafter, an incident is initiated for each selected event not having an associated predefined task.

Computer program products, which may be embodied on computer readable-material, are also described. Such computer program products may include executable instructions that cause a computer system to conduct one or more of the method acts described herein. Similarly, computer systems are also described that may include a processor and a memory coupled to the processor. The memory may encode one or more programs that cause the processor to perform one or more of the method acts described herein.

The subject matter described herein may provide one or more of the following advantages. System management activities, such as manually monitoring system and application components, are automated, which allows the reallocation of IT resources that were once required for such labor and time intensive tasks. Moreover, the efficiency and accuracy of incident resolution can be increased due to the automatic collection and association of context or diagnostic data with the incident.

The details of one or more implementations are set forth in the accompanying drawings and the description below. Other features and advantages will be apparent from the description and drawings, and from the claims.

DESCRIPTION OF DRAWINGS

FIG. 7 is a view of an incident instance user interface for a health check monitoring process and architecture of FIGS. 2 and 3, respectively.

FIG. 8 is a view of an incident context data user interface for a health check monitoring process and architecture of FIGS. 2 and 3, respectively.

Like reference symbols in the various drawings indicate like elements.

DETAILED DESCRIPTION

System Overview

Figure 1:
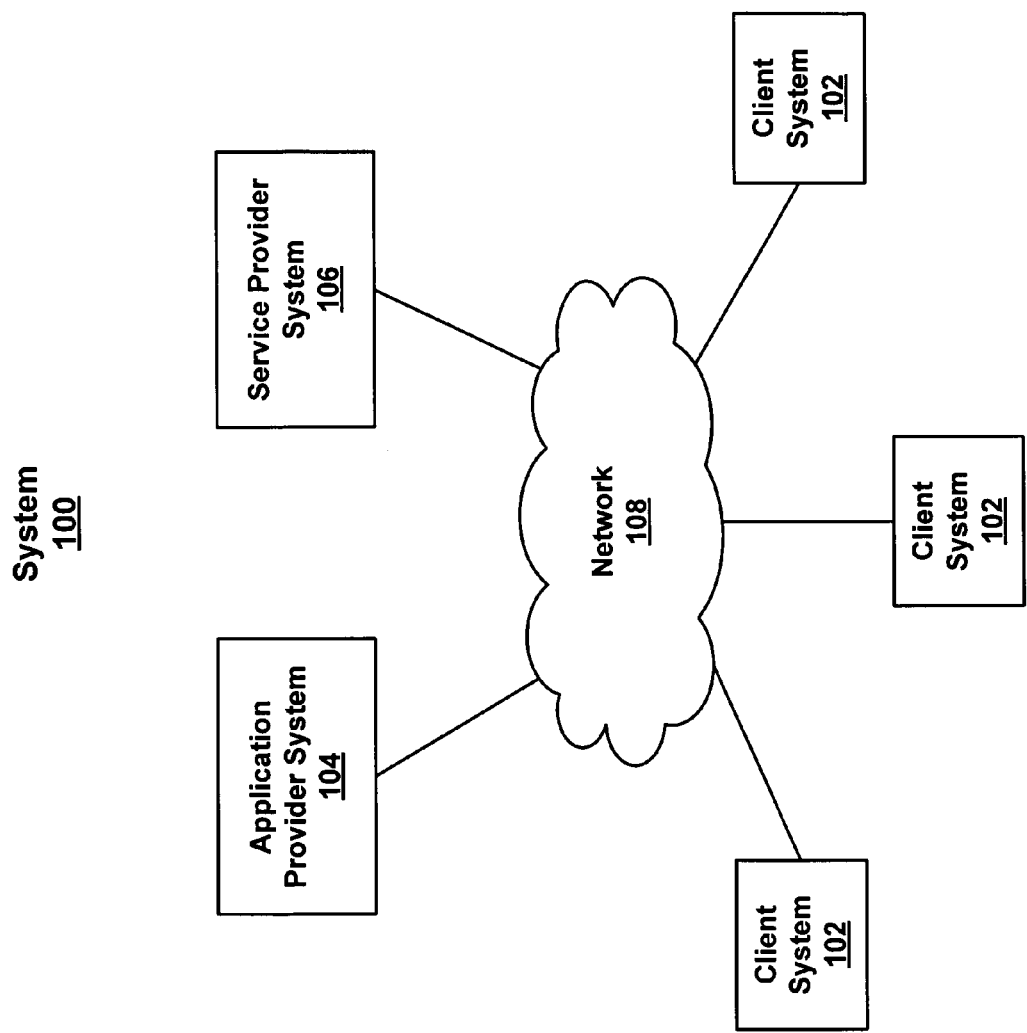
FIG. 1 is a schematic diagram of a health check monitoring process system.

FIG. 1 is a schematic diagram of a system 100 that can utilize a health check monitoring process described herein. The system 100 includes one or more client systems 102, a back-end system 103 (e.g., an application provider system 104 and a service provider system 106), which are operatively coupled to a network 108, such as the Internet, an intranet, a local area network, an Ethernet, a wireless network, and/or a telephone network. The application provider is the provider (manufactuer) of the enterprise software. The service provider provides services for the enterprise software (e.g., user and system support, implementation service, etc.) The client systems 102 can be any systems that run software. The software can be a single application or an operating system, or a collection of software applications or software components that perform various tasks in a larger system or application, such as a business application suite, such as customer relationship management (CRM), business administration, financial, and manufacturing software.

Generally, the system 100 can utilize a health check monitoring process embedded in one or more client systems 102 to constantly monitor the system and application components of the client systems 102 and create incidents and/or administration tasks if a critical situation is detected. Thus, the need for manual monitoring is eliminated. The incidents are provided to users, such as IT administrators, with instant access to context or diagnostic information to resolve or elevate the incident. Incidents can be generated automatically after detection of a change in the system or the application components (e.g., a change in system or application component activity, a monitored performance value exceeding a predefined threshold, or a change in system or application component status, such as a queue overflow that stops a business process, etc.) The health check monitoring process can be embedded in or more of the client systems 102 and is described more fully with reference to FIGS. 2-8.

One or more of the client systems 102 also can include other embedded services, including but not limited to an integrated operations handbook, software maintenance management, incident processing and management (embedded support), and safeguarding. The integrated operations handbook can include automated task and incident handling and a central administration console for operational management. Each task in the integrated operations handbook is associated with specific details of handling the task, such as when the task has to be performed (event based or time based), the responsible person (role), documentation on the task, and information on the service level agreement. A guided activity transaction, e.g., a wizard, may be provided to help a user perform an administration task, which guides the user through a defined activity. The incident processing and management service (embedded support) can provide end user support for incidents created by the health check monitoring process or the user and provide end user support and automated context collection for resolving incidents created by an end user. An end user can manually create an incident through a support application, which can be invoked from any application screen to report a malfunction in the application or the user can use a support button, for example, in a self service view of a control center user interface.

It should be apparent that the system 100 is exemplary and other configurations, arrangements and network topologies for system 100 are possible, including more or fewer clients 102 and/or multiple back-end systems 103. In some variations, the application provider system 104 and/or the service provider system 106 are/is integrated with the client systems 102 through the network 108, which can be configured to facilitate continuous or periodic data exchange between the systems 104, 106 and the client systems 102 using known networking protocols, such as TCP/IP and HTTP. In some variations, an application provider system 104 need not be used in system 100. Likewise, a service provider system 106 need not be used in alternative variations of system 100.

From time to time, system configuration information associated with the client systems 102 is transmitted to the back-end system(s) 103. In some implementations, the back-end system(s) 103 request(s) system configuration information from the client systems 102 on a scheduled basis using, for example, a polling scheme. In other implementations, the client systems 102 send information to the back-end system(s) 103 continuously or periodically, or in response to one or more events, for example notification of an incident or administration task.

Health Check Monitoring Process Overview

Figure 2:
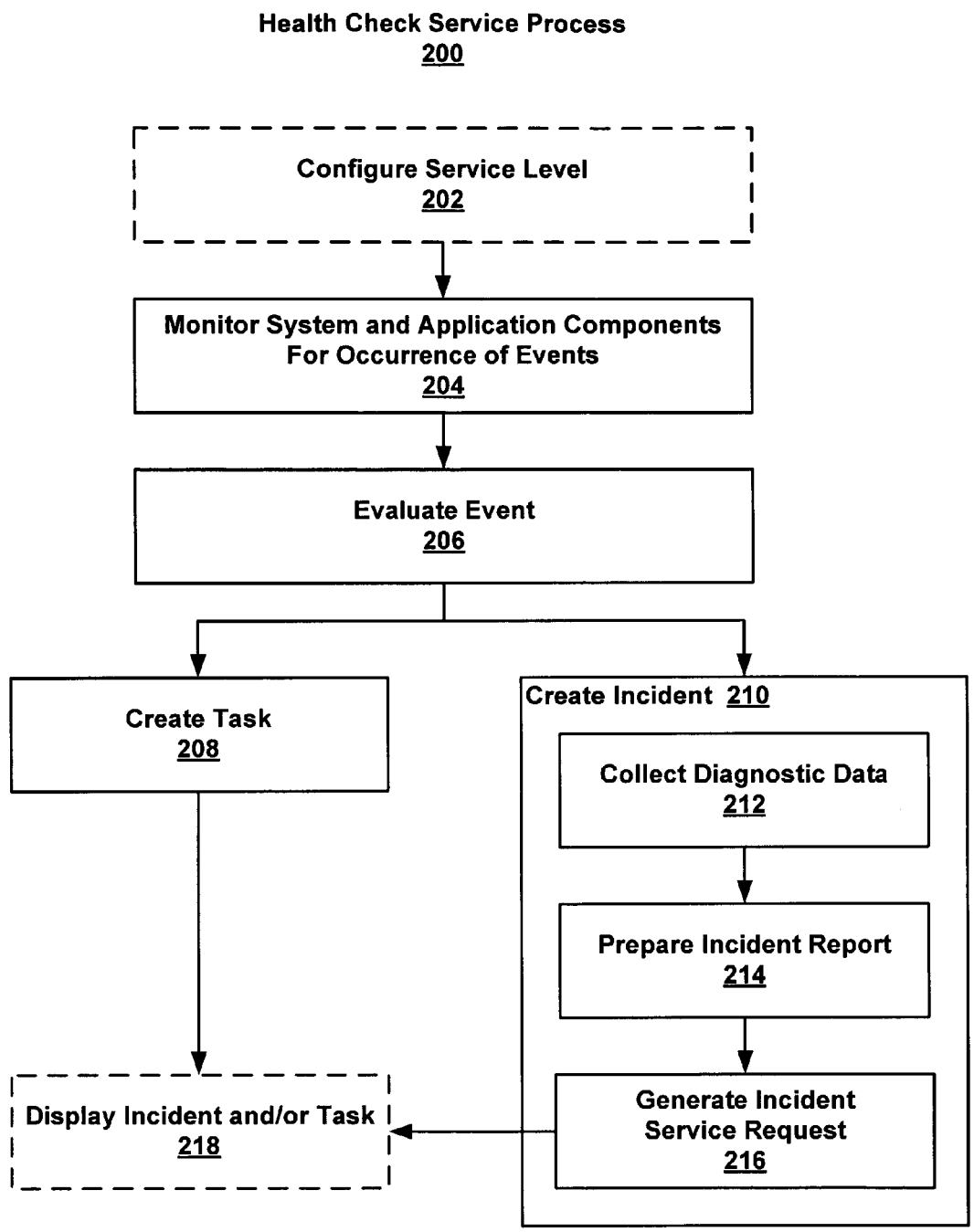
FIG. 2 is a process flow diagram of a health check monitoring process.

FIG. 2 is a flow diagram of a health check monitoring process 200. Generally, the process 200 either continually or periodically checks the system and application components residing in a client system 102 and creates incidents and/or administration tasks if a critical situation is detected. At 202, an operator of a client system (e.g., an IT administrator) configures the service level for client system 102 using, for example, a service level configuration user interface as described in FIG. 4. The operator may define the schedule that the process 200 is performed, e.g., constantly or periodically, such as every hour or daily. Step 202 is performed during configuration time, i.e., once the operator configures the service level, he or she does not have to reconfigure the service level to initiate process 200 unless the operator desires to change the schedule or other service level information. Thus, during run-time of process 200, step 202 is typically not performed as the operator has already set the service level during design time.

In some implementations, the process 200 begins in accordance with the pre-defined schedule, e.g., hourly or daily, set by the operator of a client system (e.g., an IT administrator) during service level configuration 202. In other implementations, the process 200 begins when initiated by the operator. Once the process 200 is initiated, at 204, the system and application components of the client system 102, whether decentralized or local, are monitored for the occurrence of any events. An event, for example, is a change in system or application status or a system or an application performance value exceeding a threshold. Monitored events are stored and pushed to an evaluation engine, such as an event classification engine of a health check monitor, where, at 206, the pushed events are evaluated. In some implementations, process 200, when initiated may start at 206, as 202 can occur separately from process 200. In these implementations, it may be desired to monitor the system and application components of the client system 102 constantly and not require the execution of the monitoring to be tied to the initiation schedule of process 200.

The evaluation of events, at 206, may include two processes. In the first process, each event can be routed based on rule logic (e.g., AND, OR, NOT AND, etc.), which, e.g., may be retrieved from a rules catalog of an integrated electronic operations hand book, which also includes other data storages, such as a task catalog and configuration data. The rules logic may include scenarios, such as "if A AND B then C," or "if A AND B, then NOT C." The rules-based classification and routing can include time dependent rules logic, such as "if A happens more than B times in C seconds, then D" or "if A happens AND NOT B happens within the next C seconds, then D." The rules logic can also include logic that classifies and routes an event based on severity and system impact, such as for an evaluation of a single event regarding its attributes in point in time. Moreover, the rules logic can include logic that classifies and routes events based on an evaluation of a single event according to the frequency of its occurrence. For example, some events can be meaningless if they occur only once, but can indicate a severe issue if they happen more frequently, such as a performance event that occurs more often over time. The rules logic further can include logic that classifies and routes different events occurring at the same time, which may be useful to identify the actual system status. For example, if a certain server does not respond and the corresponding network link indicates a network failure, then the actual problem is more likely a network issue rather than a service problem. This information can be used in order to trigger an appropriate system analysis. The rules logic also can include logic that classifies and routes multiple events occurring over a period of time.

As an example of an event being classified and routed based on rule logic, assume a database response time exceeds a certain threshold, which causes the generation of an event. But say, e.g., the event occurs only during the night while a time-consuming batch job is running. As a result, the rules-based classification and routing process may determine that the event need not be routed for further processing, e.g., by the second process of the evaluation 206). As another example, assume the database time exceeds a certain threshold several times, and the response time values increase over time during productive working hours. As a result, the rules-based classification and routing process may determine that the event needs to be routed for further processing, e.g., by the second process of the evaluation 206. Typically, these routed events are critical system events from the application components.

In some implementations the rules catalog (data storage) can be maintained by the client system 102, the application service provider system 104, and/or the service provider system 106. The first process is designed to handle the processing of a high throughput of events in a short time frame. As a consequence, the analysis at his level is not as detailed as may be required for the eventual resolution of a routed event. As a result, the second process is provided, which can provide more detailed analysis of each rule-based routed event. In some implementations, the first process can occur locally in each client system 102, while the second process can occur on a central client system 102.

With respect to the second process of 206, each rule-based routed event triggers the execution of the second process of 206. The second process of 206 retrieves the routed event input (e.g., response time values, file system usage, CPU usage, etc.) and determines whether the routed event should be classified as an incident or an administration task. In some implementations, additional information about the routed event may be desired and can be retrieved from the system and application components associated with the event in order to determine whether the routed event should be classified as an incident or an administration task. Based on the retrieve information, the tasks which are necessary to analyze and resolve the event are selected from, e.g., a task catalog (data storage) of a integrated electronic operations handbook, and processed to determine whether to classify the routed event as an incident or an administration task. If the tasks necessary to analyze the event are located, the event is classified as an administration task; otherwise the event is classified as an incident.

In other words, classifying the generated event as either an incident or an administration task can be based on predefined criteria, as provided by the task catalog of the integrated operations handbook. The task storage includes predefined task events and can also include other information, such as task schedules, task responsibilities, and service level agreement data. In some implementations, the task storage defines the responsible person for processing the task event. Thus, in some implementations, evaluating whether a routed event should be classified as an incident or task can be accomplished by searching the task storage of the operations handbook to determine if the routed event is listed in the operations handbook. If the generated event is not listed, then the generated event can be classified as an incident. If the generated event is listed, then the generated event can be classified as an administration task.

If, at 206, the generated event is evaluated and determined to correspond to an administrative task (e.g., a configuration parameter needs to be changed according to a predefined schedule), then at 208, an administration task is created and associated context data is provided with the administration task. Optionally, an administration task can be time-based triggered, e.g., periodic administration task or a combination of time-based triggered and event-based triggered (step 208). Next, at 218, the created administration task may be optionally displayed, e.g., in user interfaces as described in FIGS. 5 and 6 for use during task management.

If, at 206, the generated event is evaluated and determined to correspond to an incident, at 210, an incident is created, and, at 218, may be optionally displayed in a service desk environment, e.g., in user interfaces described in FIGS. 5-8. Within the step of creating an incident 210, the context (or diagnostic) data associated with the incident is automatically collected. The context or diagnostic data may include, e.g., technical and application information, that is usually required to resolve the incident. The context data can include, e.g., relevant system and application information from all architectural layers, such as a user interface layer, enterprise service layer, a business object layer and a system layer. Because the context data is automatically collected, at or near the time the event, which caused the creation of the incident, occurred, the state of the system or application components causing the incident is preserved (unlike conventional systems in which an operator may attempt to resolve the incident after the associated log files or other system or application component context information may have already been deleted).

Next, at 214, an incident report is generated, which provides an explanation of the why the incident was triggered with the collected context data. Thereafter, at 216, an incident service request is generated, typically by a service desk, such as a Customer Relationship Management (CRM) system residing on an application platform within the client system 102. In such implementations, the service desk receives the incident report, stores the report, and generates the service request. The incident service request may then be optionally displayed in a user interface as described in FIGS. 5-8 so that an operator or other end user can be visually notified of the incident service request and track the status of the incident service request.

Health Check Monitoring Process Architecture

Run Time

Figure 3:
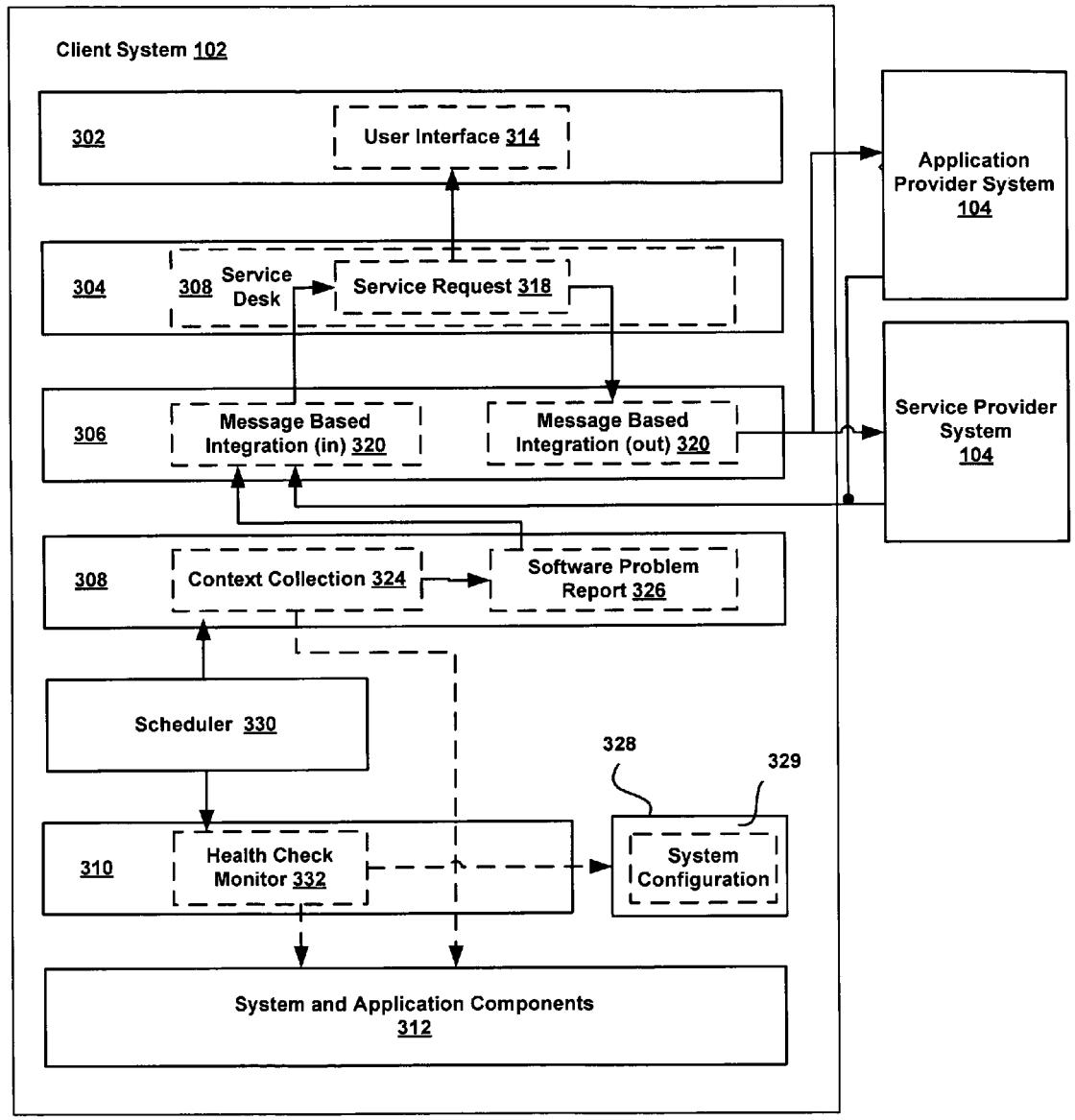
FIG. 3 is a schematic diagram of a health check monitoring process architecture during run time of incident creation.

FIG. 3 is a schematic diagram of a health check monitoring process architecture 300 illustrating run time incident creation and notification. The architecture 300 includes one or more software layers, each including one or more software components for performing various task associated with the health check monitoring process 200. In some implementations, the software layers include a user interface layer 302, an application platform layer 304, a process integration layer 306, a data packaging layer 308, a scheduler 330, services delivery layer 310, a services landscape layer 328, and a system and application components layer 312.

The architecture 300 will be explained in context with a run-time creation of an incident. After an operator, such as an IT administrator, configures the service level for the health check monitoring process as described in FIG. 2, the scheduler 330 dictates when the health check monitoring process is activated, unless overridden by an operator or user-initiated execution of the health check monitoring process. If the scheduler 330 has been configured to run the health check monitoring process every minute, for example, then at the designated time, the scheduler 330 causes the health check monitor 332 in the services delivery layer 310 to retrieve the system configuration 329 from the services landscape layer 328. Alternatively, the system configuration 329 may be pushed to the health check monitor 332 upon notification that the health check monitor has been initiated. In some implementations, the health check monitoring process may be constantly running 24 hours a day, 7 days a week.

The system configuration information 329 includes system operational parameters of the system and application components, such as generated system events and performance values. Based on the retrieved or pushed system configuration information 329, the health check monitor 332 evaluates the operational parameters (e.g., generated events) as described in step 206 of FIG. 2. In this implementation, the health check monitor 332 determines the generated event is an incident and initiates the creation of the incident. That is, the health check monitor 332 informs the context collection 324 in the data packaging layer 308. Based on the incident, the context collection 324 automatically collects context (or diagnostic) data that is needed to resolve the incident The context data is provided to the software problem report 326 in the data packaging layer, which generates an incident report and stores the context data. The message based integration (in) 320 in the process integration layer 306 receives the incident report and context data, other incident reports if generated, and messages from the back-end system(s) 103, such as incident handling or management activities (embedded support), such as data related to resolution of an incident. The message based integration (in) queues the incident reports and messages and provides it to the service request 318 in the service desk 308 (e.g., a CRM system), which resides in the application platform layer 304. Based on the incident report, the service desk 308 stores the incident report in the service request 318 and can attach the context data to the service request 318, which may be provided to the user interface 314 in the user interface layer 302. In some implementations, the processing of the software problem report 326 and the processing of the service request 318 may reside in different client systems 102, which is possible because of the message-based integration components 320 in the process integration layer 306.

Depending on the service level agreement between the customer and application provider and service provider, the message based integration (out) 320 in the process integration layer 306 queues outbound messages to the back-end system(s) 103, e.g., where the service level agreement requires the application provider 104 and/or the service provider system 106 to monitor the system and application components of the client system 102. In other implementations, the outbound messages may concern notification messages of the created incidents with the context data attached.

The user interface layer 302 includes various software components for generating a user interface 314, including the screen shots shown in FIGS. 4-8, and presenting the user interface 314 at the client system 102, including the service request (i.e., the incident and context data). In some implementations, the user interface 314 is presented as a web page which is served by a web server at the back-end system(s) 103, which can then be viewed through a browser (e.g., Microsoft Internet Explorer®). In other implementations, an application or service running on the client system 102 generates the user interface 314 using information generated within the client system 102 and/or the back-end system(s) 103, which can be accessed through an application program interface (API) or other hook into the back-end system(s) 103 (e.g., a web portal).

It should be apparent that the architecture 300 is exemplary, and other architectures can be used that have more or fewer components or layers. The various components of the architecture 300 can be located at the client system 102 and/or back-end system(s) 103. In some implementations, the architecture 300 is implemented by a single program or application or by one or more components of an operating system on the client system 102.

User Interfaces

FIGS. 4-8 are screen shots of an implementation of a user interface (UI) for managing incident generation using the health check monitoring process and architecture shown in FIGS. 2 and 3, respectively. FIGS. 4-8 are described from the perspective of a fictitious IT administrator named "Jeff Goldblume." The UIs shown in FIGS. 4-8 are exemplary, as other UIs can be used as desired, including more or fewer UIs with various views, numbers and types of user interface elements, such as links, controls, search boxes, buttons, navigation bars, filters, and menus.

User Interface

Service Level Configuration

Figure 4:
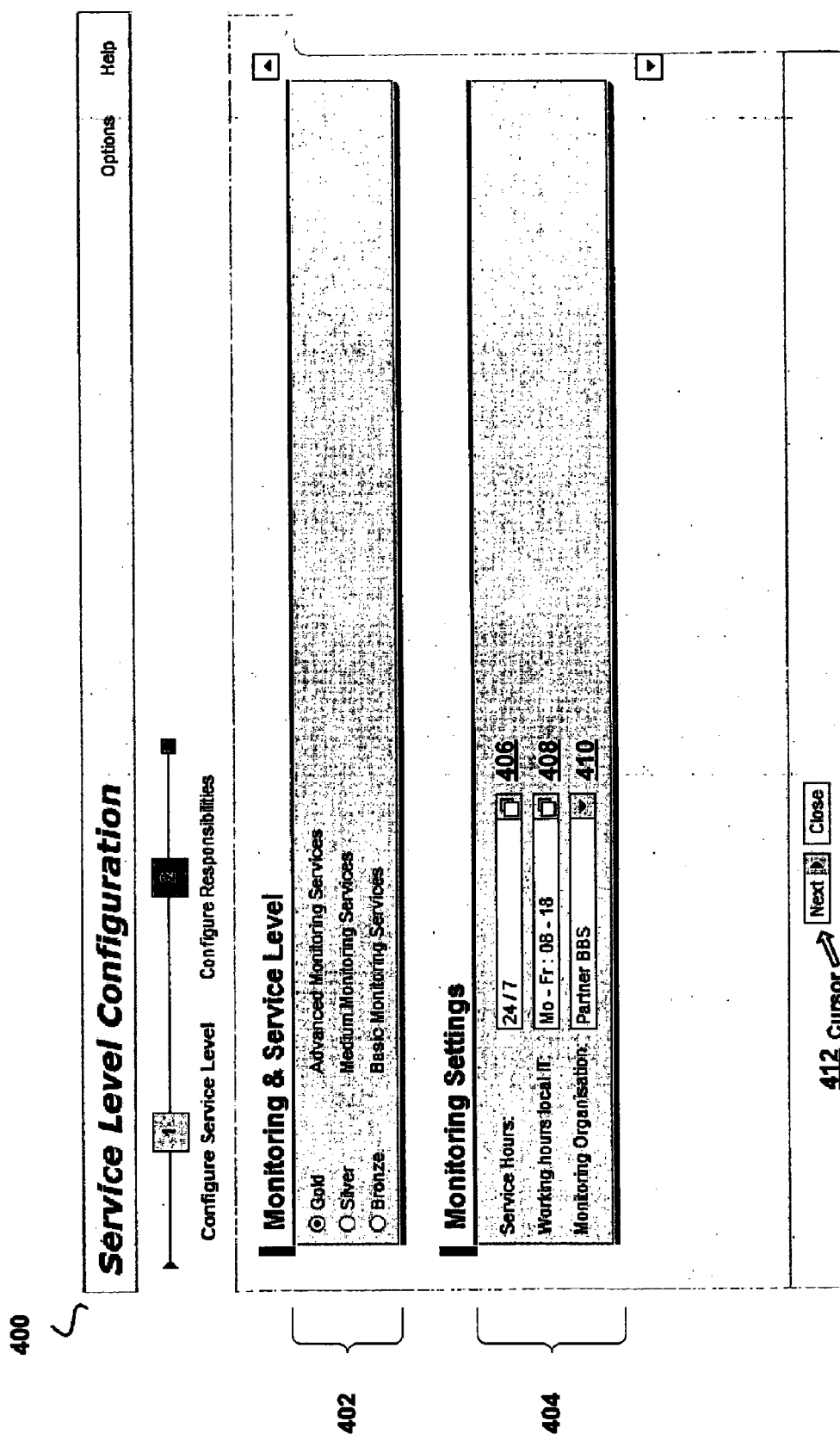
FIG. 4 is a view of a service level configuration user interface for the health check monitoring process and architecture of FIGS. 2 and 3, respectively.

FIG. 4 is a screen shot of a service level configuration user interface 400 for the health check monitoring process and architecture of FIGS. 2 and 3, respectively. Application service providers typically define levels of system service and responsibility using service level agreements (SLA) with its customers. The IT administrator of the customer may configure the health check monitoring process using information from the customer's SLA. Here, the IT administrator "Jeff" may log onto the service level configuration UI 400 to set the monitoring and service level 402 and the monitoring settings 404. The monitoring and service levels 402 can include, for example, a "Gold" advanced monitoring services, a "Silver" medium monitoring services and a "Bronze" basic monitoring services. As seen in FIG. 4, the "Gold" services has been selected. The monitoring settings 404 can include, for example, service hours 406, working hours local IT 408 and monitoring organization 410. In this case, Jeff set the service hours 406 to be 24 hours a day, 7 days a week. He set the working hours local IT 408 to be Monday through Friday, from 8 a.m. to 6 p.m. Jeff also set the monitoring organization 410 to be a service provider called "Partner BBS." Jeff can use his mouse cursor 412 to click on a "Next" button, which results in the display of a configure responsibilities UI (not shown), where Jeff may configure the responsible party for handling certain levels of incidents and tasks.

User Interface

Control Center Home Page

Figure 5:
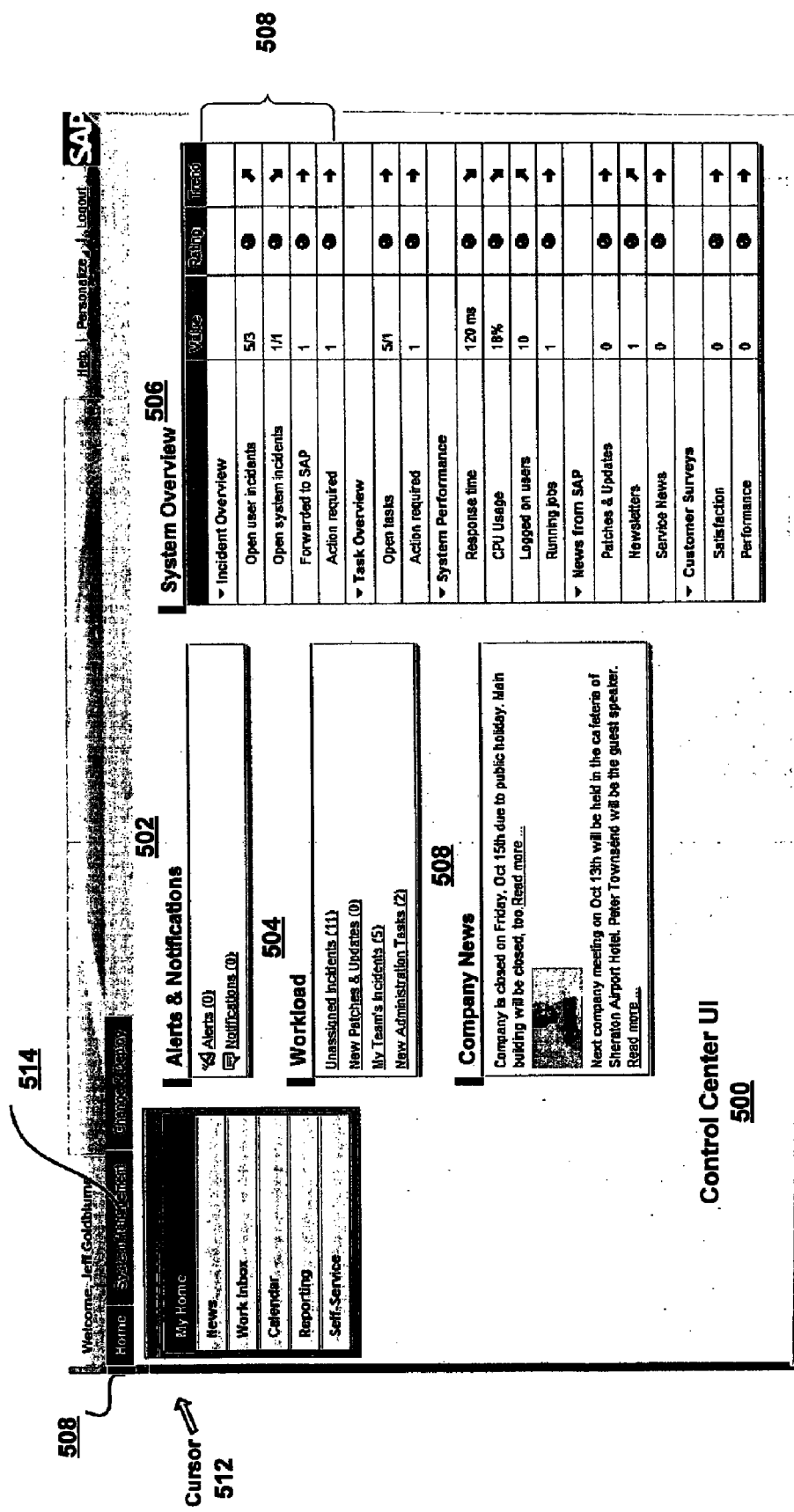
FIG. 5 is a view of a control center home page user interface for a health check monitoring process and architecture of FIGS. 2 and 3, respectively.

FIG. 5 is a screen shot of a control center user interface 500 for a health check monitoring process and architecture of FIGS. 2 and 3, respectively. The control center user interface 500 can be the initial starting point for an end user, such as an IT administrator, after logon. The user interface presents summarized information from all work centers assigned to the end user. In this implementation, the user interface 500 includes a My Home view, a News view, a Work Inbox view, a Calendar view, a Reporting view, and a Self-Service view. The My Home view is the first screen an end user sees after login. The Work Inbox view contains alerts and notifications in an e-mail inbox list. The work inbox includes system events and administrations tasks that are urgent, vary import, escalated or overdue. The Reporting view contains all reports available in the different work centers. The News view contains, among other company news, a system news page, where IT administrators can post important information about the system status. The System News page in the News view can be available to every user. The Self-Service view contains, among other self-service applications, an application where every user can create a problem message, e.g., an incident or request a service, e.g., for a change of authorization in the system) from the IT department. The service request application in the Self-Service view can be available to every user.

The IT administrator, Jeff logs onto "home" 512 page after logon, and uses his mouse cursor 512 to click on a "My Home" view button, which enables Jeff to view a system overview of his environment, including Alerts & Notifications monitor 502, Workload monitor 504, System Overview monitor 506, and Company News monitor 508. Listed under the Alerts & Notifications monitor 504 are categories Alerts and Notifications. In this example, there are no alerts and notifications. Listed under the Workload monitor 504 are categories, including, e.g., unassigned incidents, new patches & updates, my team's incidents and new administration tasks. In this example, there are eleven unassigned incidents, which are indicated by the number 11 in parenthesis. There are five incidents noted for my team's incidents and two new administrative tasks.

The Company News monitor 508 can be used to provide a summary of recent company information, such as human resources notices or meeting announcements.

The System Overview monitor 506 provides a summary of the system and includes monitors, such as an incident overview monitor 508, a task overview monitor, a system performance monitor, a news from SAP monitor and a customer surveys monitor. As can be seen, the incident overview monitor 508 includes categories such as open user incidents, open system incidents, forwarded to SAP (e.g., an application provider), and action required. Each of these categories can be associated with a value, rating, and trend. In some implementations, the rating is color coded, so that Jeff can quickly determine the status based on the color. An example color coding scheme could be green for normal and red for error or problem. In some implementations, the trend is represented by an arrow icon oriented in various positions, so that Jeff can quickly determine the trend based on historical data associated with that particular category. An example orientation scheme could be an arrow slanted upward for a trend increase, an arrow oriented in a horizontal state for a neutral trend, and an arrow slanted downward for a trend decrease.

If Jeff wants to view the status of system management or handle management activities associated with, for example, incidents and administration tasks, he uses his cursor 512 to select the "System Management" button 513.

User Interface

System Management

Figure 6:
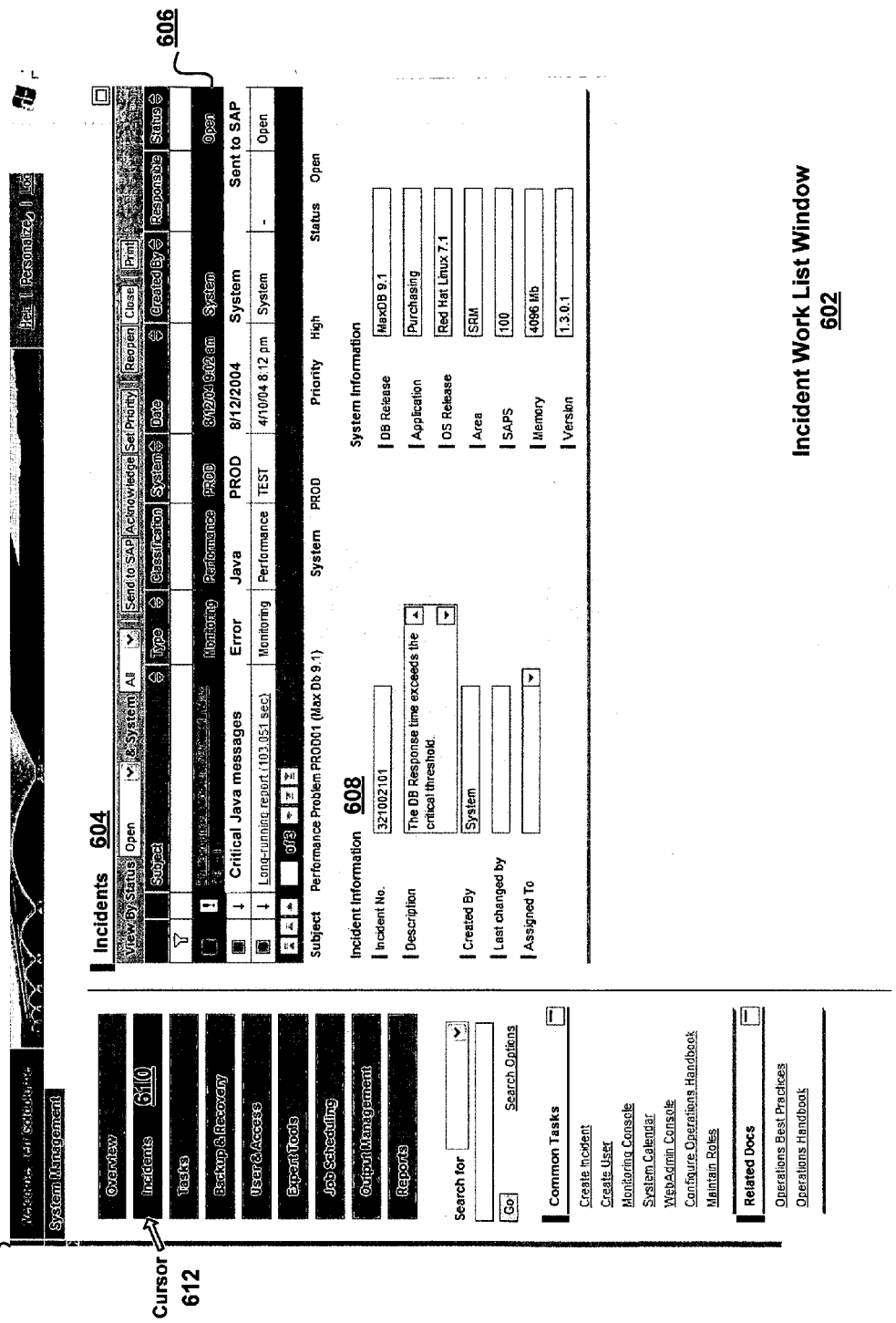
FIG. 6 is a view of a system management user interface depicting an incident work list window for a health check monitoring process and architecture of FIGS. 2 and 3, respectively.

In response to the button 513 (of FIG. 5) being clicked, a system management UI 600 is displayed as shown in FIG. 6. The system management UI 600 includes views including, e.g., overview, incidents, tasks, backup & recovery, user & access, expert tools, job scheduling, output management and reports. Jeff uses his cursor 612 to select the "incidents" button 610 that is associated with the incidents category to view a list of the incidents (e.g., active, pending and resolved incidents), which causes the display of a incident work list window 602, which includes an incident work list 604 and incident information 608 concerning a selected incident 606. The incident information 608 includes, e.g., an incident number associated with the incident 606. Here, the incident number is "321002101." In some implementations, Jeff can view more detailed information about a specific incident (whether generated by the health service described herein or a user-initiated incident). One such implementation is shown in FIG. 7.

User Interface

Incident Instance

Figure 7:
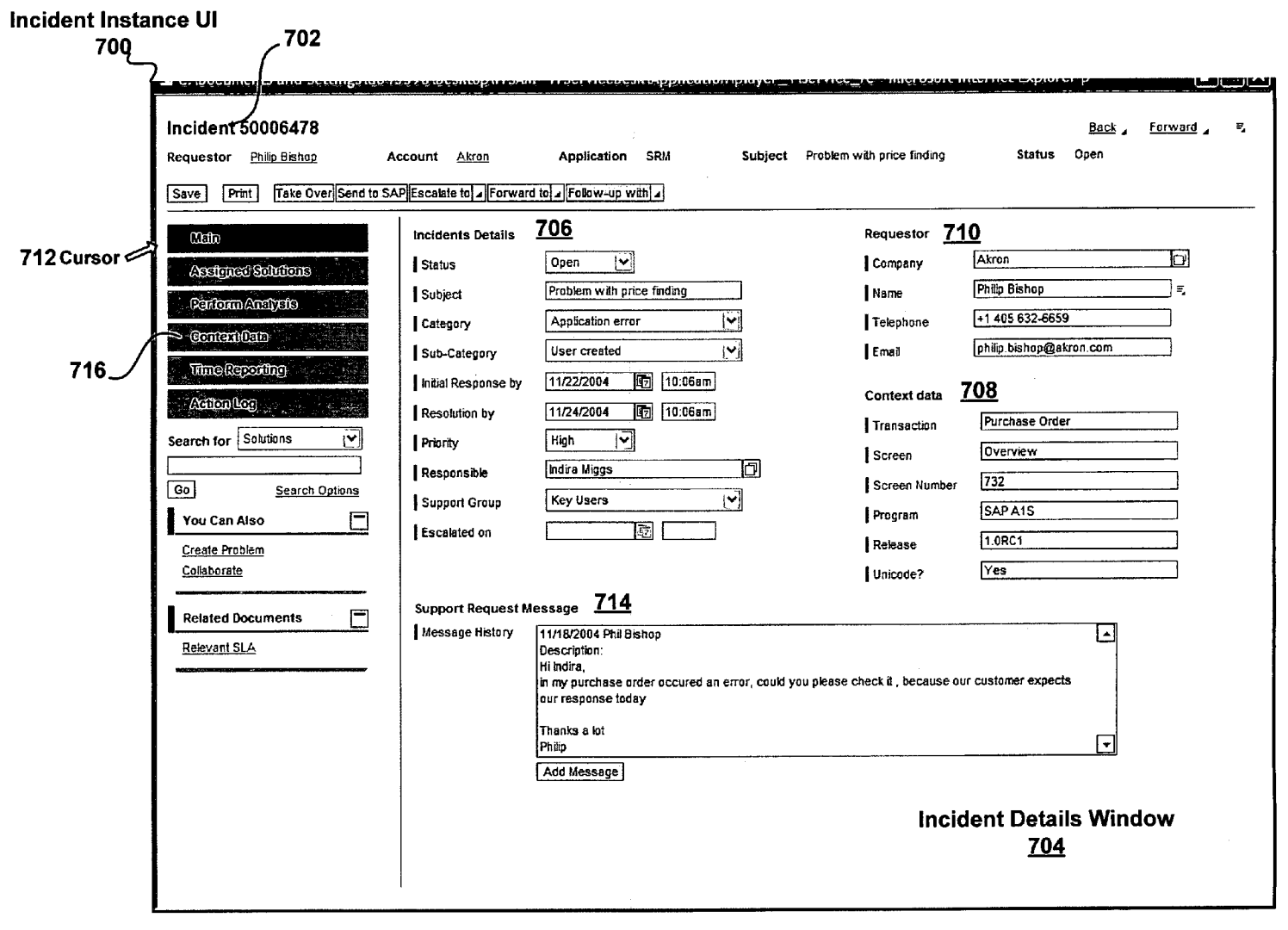

FIG. 7 is a screen shot of an incident instance user interface 700 for a health check monitoring process and architecture of FIGS. 2 and 3, respectively. The user interface 700 illustrates one implementation of depicting detailed information concerning a particular incident 702, which was user created. The incident 702 can have a incident number associated with it that can be generated by a service desk for ease of tracking the incidents. Here, the incident 702 has a tracking number "500006478."

The user interface 700 includes various categories, which are located on the left side of the screen and include, e.g., main, assigned solutions, perform analysis, context data, time reporting and action log. Jeff can select the "main" button with his cursor 612. After clicking on the "main" button, an incident details window 704 is displayed. The incident details window 704 includes an incident details section 706, a context data section 708, a requester information section 710, and a support request message section 714. The incident details section 706 may include information relating to a status, a subject, a category, a sub-category, an initial response by date, a resolution by date, a priority, a responsible party for handling the incident, a support group and an escalated on date. As can be seen, the "sub-category" information notes that the incident 702 is user created. The requestor information section 710 may include information relating to a company which made the service request, a name of the contact person at the company, a telephone number and an e-mail of the contact person. The support request message section 714 provides a message history relating to the incident 702. The context data section 708 may include information such as the transaction type, the screen where incident occurred, the screen number and the program in which the incident occurred, the release number of the program and whether the program is Unicode or not. Jeff may obtain more detailed context data by selecting the "context data" button 716 of the incident instance UI 700.

User Interface

Incident Context Data

FIG. 8 is a screen shot of an incident context data user interface 800 for a health check monitoring process and architecture of FIGS. 2 and 3, respectively. User interface 800 may be displayed, for example, in response to Jeff selecting the "context data" button 716 of FIG. 7. In this implementation, however, the context data 802 is related to an incident that different than the incident 702 of FIG. 7. The user interface 800, includes all the context (diagnostic) data, e.g., technical and application information, that is usually required to resolve the incident. The context data can include, e.g., relevant system and application information from all architectural layers, such as a user interface layer, enterprise service layer, a business object layer and a system layer. The user interface 800 has two views—a content view 804 and a provider properties view 806. The content view 804, includes a snap-shot of the log files and system information 806 associated with the incident, which was previously collected and stored. The provider properties view 806 may include, e.g., detailed information about system and application components providing context data.

Client System Architecture

Figure 9:
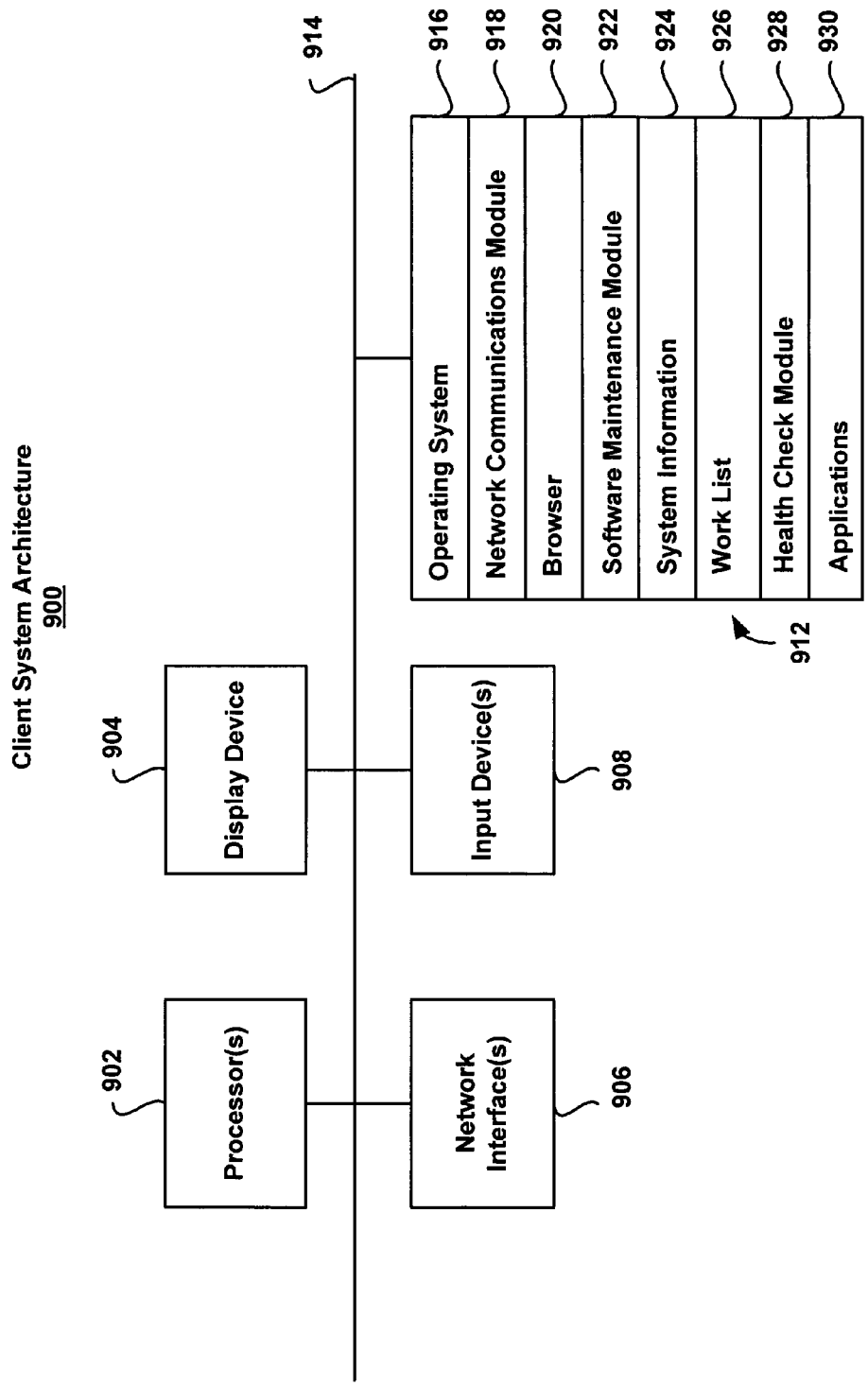
FIG. 9 is a schematic diagram of a client system architecture suitable for the health check monitoring process system and techniques disclosed herein.

FIG. 9 is a schematic diagram of a client system architecture 900 suitable for the heath check techniques disclosed herein. The architecture 900 includes one or more processors 902 (e.g., CPU), a display device 904, one or more network interfaces 906 (e.g., an Ethernet card), one or more input devices 908 (e.g., a mouse and/or a keyboard) and one or more computer-readable mediums 912. Each of these components is coupled by one or more buses 914 (e.g., EISA and/or PCI). The term "computer-readable medium" refers to any medium that participates in providing instructions to the processor 902 for execution, including without limitation, non-volatile media (e.g., optical, NOR or NAND flash, ROM or magnetic disks), volatile media (e.g., RAM) and transmission media. Transmission media includes, without limitation, coaxial cables, copper wire and fiber optics. Transmission media can also take the form of acoustic, light or radio frequency waves.

The computer-readable medium 912 further includes an operating system 916 (e.g., Windows®, Unix or Linux), a network communications module 918, a browser 920, a software maintenance module 922, system configuration information 924, a work list 926, a health check module 928, and one or more applications 930 (e.g., a suite of business applications). The operating system 916 can be multi-user, multi-processing, multitasking, multithreading, real-time and the like. The operating system 916 performs basic tasks, including but not limited to: recognizing input from input devices 908; sending output to the display device 904; keeping track of files and directories on storage devices 912; controlling peripheral devices (e.g., disk drives, printers, etc.); and managing traffic on the one or more buses 914.

The network communications module 918 includes various components for establishing and maintaining network connections (e.g., software for implementing communication protocols, such as TCP/IP, HTTP and Ethernet). The browser 920 is used to display the various user interfaces shown in FIGS. 4-8. The software maintenance module 920 provides performs software maintenance and updating processes. The system configuration information 924 includes configuration data describing the status of the system and application components of client system 102. The incident work list 926 is described with respect to FIG. 6. The health check module 928 provides various software components for performing processes described with respect to FIGS. 1-8. In some implementations, some or all of the processes performed by the health check module 928 can be integrated into the operating system 916. Applications 930 can include any software applications, such as business applications, word processors, email applications, Instant Messaging, media players, and telephony software.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "computer-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, steps in a flow diagram may be replaced with other steps, additional steps may be added, some steps optionally may be removed, and/or steps may be performed in a different order, or in parallel, relative to the order depicted. Accordingly, other embodiments are within the scope of the following claims.

What is claimed is:

1. A computer-implemented method of managing a system, the method comprising:

selectively receiving at least one generated event, each generated event indicating a change in an operational parameter of one of a plurality of components of the system, each generated event being received if the event triggers at least one predetermined logical rule, the predetermined logical rule comprising an error severity threshold, wherein the error severity threshold comprises a frequency of the event received within a previous predetermined time duration and a severity of the event at a time instance;

storing the at least one generated event in a system configuration data store;

determining, for each received event, whether the received event has an associated predefined task, the predefined task comprising a periodic maintenance procedure to be performed on the managed system;

initiating a generation of an incident for each received event not having an associated predefined task, the incident comprising an interruption to standard operation of the managed system; and initiating a generation of an administrative task for each received event having an associated predefined task.

2. The computer-implemented method of claim 1, wherein the at least one predetermined logical rule comprises at least one logical operation from a group of an AND, an OR, an XOR, a NOR, a NAND, and a NOT logical operation.

3. The computer-implemented method of claim 2, wherein at least one of the at least one predetermined logical rule is an error severity threshold, wherein the error severity threshold is one of a system failure and a message failure.

4. The computer-implemented method of claim 1, wherein determining whether the received event has an associated predefined task comprises:
  retrieving a plurality of predefined events, each predefined event associated with at least one predefined task needed to resolve the associated predefined event;
  determining, for each received event, whether the received event is a predefined event; and
  associating, for each received event, the at least one predefined task with the received event that is a predefined event.

5. The computer-implemented method of claim 1, wherein initiating a generation of an incident for each received event not having an associated predefined task comprises:
  automatically collecting context data associated with each received event;
  generating, for each received event, an incident report based on the collected context data; and
  generating, for each incident report, an incident service request based on the generated incident report.

6. The computer implemented method of claim 5, wherein initiating a generation of an incident for each received event not having an associated predefined task further comprises:
  automatically storing the collected context data; and
  associating the generated incident service request with the stored context data.

7. The computer-implemented method of claim 6, further comprising displaying the generated incident service request in at least one view of a graphical user interface.

8. The computer-implemented method of claim 1, wherein selectively receiving at least one generated event, each generated event indicating a change in an operational parameter of one of a plurality of components of the system, each generated event being received if the event triggers at least one predetermined logical rule, when initiated by an activating signal generated based on a predetermined time schedule.

9. The computer-implemented method of claim 1, wherein selectively receiving at least one generated event, each generated event indicating a change in an operational parameter of one of a plurality of components of the system, each generated event being received if the event triggers at least one predetermined logical rule comprises:
  monitoring a plurality of operational parameters of a plurality of components of the system;
  detecting a change of at least one operational parameter;
  generating an event for each detected change; and
  retrieving each stored event from the system configuration data store upon generation of an activating signal if the stored event triggers at least one predetermined logical rule.

10. The computer-implemented method of claim 1, wherein the plurality of components of the system comprises:
at least one application software module, wherein at least one software module is one of a customer relation management module, a supplier relation management module, a financial management module, a supply chain management module, a human capital management module and a project management module.

11. A computer-implemented method of providing system initiated service requests, the method comprising:
  receiving at least one generated event in response to a system-generated activating signal, each generated event indicating a change in a monitored operational parameter of one of a plurality of components of a system, each generated event being received if the event triggers at least one predetermined logical rule comprising an error severity threshold, wherein the error severity threshold comprises a frequency of the event received within a previous predetermined time duration and a severity of the event at a time instance;
  storing the at least one generated event in a system configuration data store;
  automatically collecting diagnostic data associated with each generated event in response to the particular event, wherein the diagnostic data is substantially all data that is needed to resolve the generated event;
  generating an incident report, in response to the particular event, based on the collected diagnostic data, the incident report describing an incident comprising an interruption to standard operation of the system;
  generating an incident service request for each incident report; and
  associating the collected diagnostic data with the generated incident service request.

12. The computer-implemented method of claim 11, wherein generating an incident report, for each generated event, based on the collected diagnostic data comprises:
  receiving the collected diagnostic data associated with the generated event;
  providing a description of the generated event in a message based on the received diagnostic data; and
  attaching the received diagnostic data to the message.

13. The computer-implemented method of claim 11, further comprising displaying each generated incident service request in at least one view of a graphical user interface, wherein at least one view provides the collected diagnostic data associated with the generated incident service request.

14. The computer-implemented method of claim 13, wherein at least one view provides a list of generated incident service requests.

15. The computer-implemented method of claim 11, wherein receiving at least one generated event in response to a system generated activating signal, each generated event indicating a change in a monitored operational parameter of one of a plurality of components comprises:
  monitoring a plurality of operational parameters of a plurality of components of the system;
  detecting a change of at least one operational parameter;
  generating an event for each detected change; and
  retrieving each stored event from the configuration data store upon generation of an activating signal.

16. The computer-implemented method of claim 15, wherein the plurality of components of the system comprises at least one application software module, wherein at least one software module is one of a customer relation management module, a supplier relation management module, a financial management module, a supply chain management module, a human capital management module and a project management module.

17. A computer-implemented method of automatically generating service requests, the method comprising:

receiving at least one generated event, each generated event indicating a change in a monitored operational parameter of one of a plurality of components;

storing the at least one generated event in a system configuration data store;

classifying a received event as an incident when at least one of a plurality of predefined logical rules is satisfied based at least in part upon whether at least one predefined task is associated with resolving the received event, the incident comprising an interruption to standard operation of at least one of the plurality of components, the predetermined logical rule comprising an error severity threshold, wherein the error severity threshold comprises a frequency of the event received within a previous predetermined time duration and a severity of the event at a time instance;

automatically collecting context data for each classified event in response to the particular event;

generating, for each classified event, a problem report, wherein the problem report includes a description of the classified event; and generating an incident service request, for each classified event, including the description of the classified event from the corresponding problem report.

18. The computer-implemented method of claim 17, further comprising displaying each generated incident service request in at least one view of a graphical user interface, wherein at least one view provides the collected diagnostic data.

19. The computer-implemented method of claim 17, wherein classifying a received event as an incident when at least one of a plurality of predefined logical rules is satisfied comprises:

selecting at least one of the received events based on a plurality of predetermined rules;

determining, for each selected event, whether the selected event has an associated predefined task; and initiating a generation of an incident for each selected event not having an associated predefined task.

20. The computer-implemented method of claim 1, wherein the predetermined logical rules comprise a first set of rules and a second set of rules, and wherein selectively receiving at least one generated event comprises:

determining whether the event triggers a rule in the first set of rules in a high-throughput pass; and if the event triggers a rule in the first set of rules, determining whether the event triggers a rule in the second set of rules in a second more detailed pass.

* * * * *